US007261928B2

(12) United States Patent
Jokela et al.

(10) Patent No.: US 7,261,928 B2
(45) Date of Patent: Aug. 28, 2007

(54) PACKAGE COATING, PROCESSES OF MAKING, AND PACKAGING SYSTEMS

(75) Inventors: Melvin Jokela, Cloquet, MN (US); Cathy Kortesmaki, Duluth, MN (US); Ann Williams, Lewiston, ID (US)

(73) Assignee: Potlatch Corporation, Bemidji, MN (US)

( * ) Notice: Subject to any disclaimer, the term of this patent is extended or adjusted under 35 U.S.C. 154(b) by 257 days.

(21) Appl. No.: 10/695,031

(22) Filed: Oct. 28, 2003

(65) Prior Publication Data

US 2005/0089660 A1 Apr. 28, 2005

(51) Int. Cl.
*C09K 13/00* (2006.01)
*D06L 3/12* (2006.01)

(52) U.S. Cl. .................... 428/35.9; 427/158; 162/137; 252/301.21

(58) Field of Classification Search ...... 428/34.2-34.3, 428/168, 35.9; 427/391, 411, 158, 403; 229/5.81, 229/5.83-5.84; 162/136-137; 252/301.21
See application file for complete search history.

(56) References Cited

U.S. PATENT DOCUMENTS

| | | | | |
|---|---|---|---|---|
| 4,898,752 A * | 2/1990 | Cavagna et al. | ............ | 427/265 |
| 5,439,707 A * | 8/1995 | Nelli et al. | ................ | 427/258 |
| 5,693,373 A * | 12/1997 | Kinsey, Jr. | .................. | 427/496 |
| 5,776,619 A * | 7/1998 | Shanton | ...................... | 428/511 |
| 6,110,548 A * | 8/2000 | Kinsey | ...................... | 428/34.2 |

* cited by examiner

*Primary Examiner*—Rena Dye
*Assistant Examiner*—Sow-Fun Hon

(74) *Attorney, Agent, or Firm*—Schwegman, Lundberg, Woessner & Kluth, P.A.

(57) ABSTRACT

A package coating is processed by applying a plurality of aqueous mixtures over a substrate. The aqueous mixtures each include a combination of pigments and binders. A packaging article is also disclosed that is made from the package coating on a substrate. Additionally, a packaging system is included that contains commercial product.

17 Claims, 4 Drawing Sheets

PACKAGE COATING, PROCESSES OF MAKING, AND PACKAGING SYSTEMS

BACKGROUND INFORMATION

1. Technical Field

An embodiment relates to a liquid-packaging article that includes a brightener first film that has been formed by flowing a mixture over a substrate. A brightener second film is formed over the brightener first film, and a finish third film is formed over the brightener second film. One embodiment includes a packaging system that includes a folded substrate and a product in the folded substrate.

2. Description of Related Art

Paperboard packaging, such as a gable-top liquid container, is typically produced on a paperboard machine without a pigmented coating applied to the outer surface. A laminated and folded article is the result.

Liquid food products such as milk and juices can be packaged in cartons that are formed from the laminated packaging material as described above. The cartons may be in form of gable-top cartons, or others. A gable-top carton can be formed from a precut blank that is fed to a filling machine. The machine folds the blank into a package capsule, which is subsequently sealed together longitudinally and at the bottom, filled with liquid food product and finally closed and sealed at the top of the carton.

During the converting of paperboard packaging, a bright ink, such as a white ink may be applied in one or more "printings" in order to subdue the less-bright color of the paperboard substrate. Thereby a higher brightness is achievable in preparation for commercial information that can be printed on the paperboard. The bright- or white-ink printing processes are expensive and time consuming, and are extra processes in addition to other substrate preparations.

Other shapes besides a gable-top or block-shaped package may be formed directly from a continuous web of the packaging material. For example, the web of laminated packaging material can be shaped into a tube, sealed longitudinally along the tube, filled with the product, and transversely sealed across the tube into pillow-shaped packages, which packages are finally cut off from the tube. Finally, the flaps of the pillow-shaped containers are sealed to the sides of the package in order to shape it into a parallelepipedic block- or brick-shaped packaging container.

In all types of gable-top-, block-shaped packages and others, the packaging material is provided with crease lines to facilitate folding along predetermined lines.

Additionally, skiving must often be done to prevent liquid impregnation into the laminate where it makes a seam inside the package. These methods of manufacturing of packages are well known in the field of packaging.

What is needed in the art is process of preparing a substrate that overcomes problems in the prior art, including a number of which have been mentioned.

SUMMARY

One embodiment includes a process. The process includes forming a first mixture over a substrate. The first mixture includes a first mixture first fluid content. The first mixture includes from about 75% to about 82% inorganics and the balance organics. The process includes lowering the first mixture first fluid content to a first mixture second fluid content. This can be done by heating according to conventional technique. Optionally, the process can include forming a second mixture over the first mixture. The second mixture includes a second mixture first fluid content that includes from about 70% to about 86% inorganics and the balance organics. After forming the optional second mixture over the first mixture, the second mixture first fluid content is lowered to a second mixture second fluid content, such as by heating. Thereafter, a finish film is formed over the substrate.

Another embodiment includes a packaging article. The packaging article includes substrate including a first side, with a brightener first film above the substrate. The brightener first film includes calcium carbonate in a first amount, and brightener particles in a second amount. The first amount is more than the second amount. The brightener first film also includes at least one binder. In one embodiment, a sizing layer is between the substrate and the brightener first film. An optional brightener second film is located above the first brightener film. The brightener second film, if present, includes calcium carbonate in a third amount, and brightener particles in a fourth amount. The fourth amount is more than the third amount. The brightener second film also includes at least one binder. A finish third film is located above the top brightener film.

In one embodiment, the packaging article is folded into a container. In one embodiment, no skiving is required at the edge of the container that can come into contact with a liquid.

Another embodiment includes a packaging system. The packaging system includes folded and bonded embodiments of the packaging article. Additionally, the packaging system includes a commercial product within the folded and bonded substrate.

BRIEF DESCRIPTION OF THE DRAWINGS

In order to illustrate the manner in which embodiments of the present invention are obtained, a more particular description of the invention briefly described above will be rendered by reference to specific embodiments thereof which are illustrated in the appended drawings. Understanding that these drawings depict only typical embodiments of the invention that are not necessarily drawn to scale and are not therefore to be considered to be limiting of its scope, the invention will be described and explained with additional specificity and detail through the use of the accompanying figures in which.

DETAILED DESCRIPTION

Figure 1:
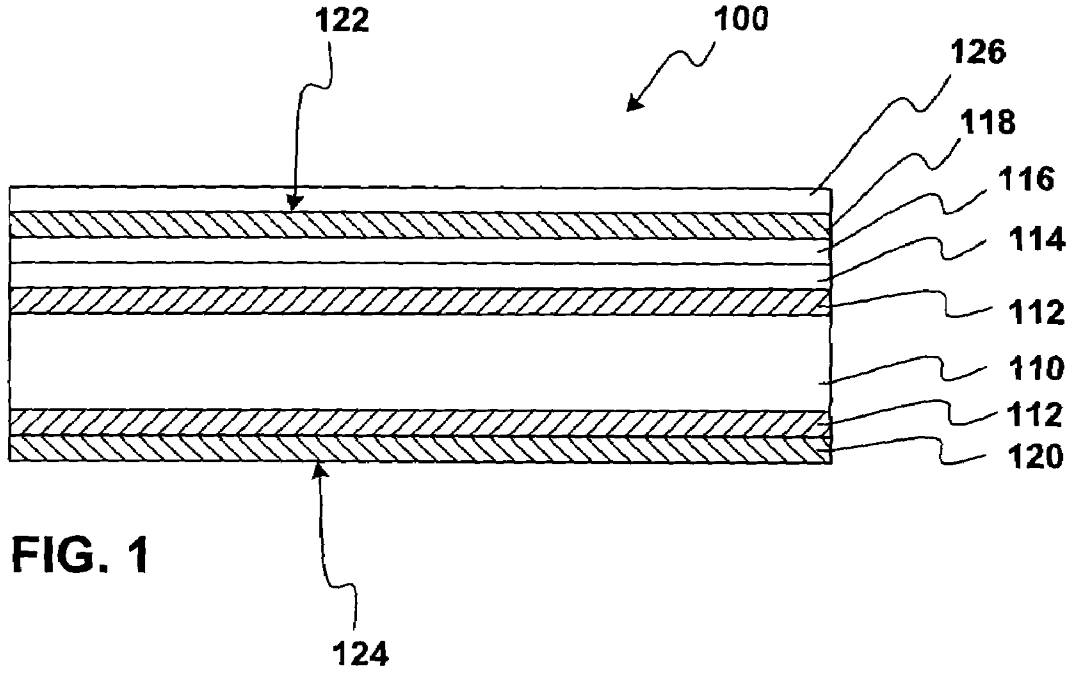
FIG. 1 is a cross-section of a portion of packaging article according to an embodiment.

In the following detailed description, reference is made to the accompanying drawings which form a part hereof, and in which is shown, by way of illustration, specific ways which embodiments may be practiced. In the drawings, like numerals describe substantially similar components throughout the several views for general embodiments. These embodiments are described in sufficient detail to enable those skilled in the art to practice various embodiments. Other embodiments may be utilized and structural, system, and process changes may be made without departing from the scope of the various embodiments.

As used herein, "substrate" refers to a packaging base material that is produced in various embodiments. In one embodiment, the substrate is a wood-fiber structure such as a paperboard material. In one embodiment, the substrate is a starch-bound matrix material. In one embodiment, the substrate is a thermoplastic material. In one embodiment the substrate is a thermoplastic starch material. In one embodiment, a combination of at least two substrates are included.

The phrases "mass producible" or manufactured in a "commercial" or "economic" manner are intended in the specification and the appended claims to refer to paperboard system described herein to be rapidly produced at a rate that make their manufacture economically viable. Process embodiments are directed to the manufacture of articles and systems which solve the prior art problems of high cost and complicated processing schemes.

The term "solids" or "total solids" is intended to include any admixture that is a solid before being mixed with diluent such as water. This includes adhesive materials, organics, inorganics, fibers, pigments, inorganic fillers, starch sizing, etc.

FIG. 1 is a cross-section of a portion of a packaging article 100 according to an embodiment. A substrate 110 supports a series of layers. Where the substrate 110 is a wood fiber-based material such as a paperboard, a sizing layer 112 can be formed upon the substrate 110. In one embodiment, the sizing layer 112 is located on both sides of the substrate 110. Where the substrate 110 is paperboard, the sizing layer 112 is typically a starch sizing layer 112 that can be formed according to conventional technique.

A brightener first film 114 is disposed above the starch sizing layer 112.

The brightener first film 114 can be referred to as a base coating layer. In one embodiment, the brightener first film 114 is a composition that can include natural and/or synthetic carbonate pigments.

The brightener first film 114 is formed above the starch sizing layer 112 in order to achieve a more homogenous finish to the substrate 110. The brightener first film 114 can impart a substantially monochromatic appearance to the packaging article 100 and can be an ink stabilizer to resist ink bleed.

A brightener second film 116 is disposed above the brightener first film 114. The brightener second film 116 can impart a substantially monochromatic appearance to the packaging article 100 and can be an ink stabilizer to resist ink bleed.

A finish film 118 is disposed above and on the brightener second film 116. The finish film 118 can impart a finish to the packaging article 100 that is one of a flat finish, a matte finish, a semi-gloss finish, a gloss finish, a high-gloss finish, and other conventional finishes. Additionally the packaging article 100 includes a barrier film 120. The barrier film 120 can be added when the packaging article 100 is used as a container such as for a liquid or wet paste food item, a solid food item, or the like. Other products can be housed in the packaging article 100 such as chemicals, cleansers, detergents, powders, feedstocks, and others.

In one embodiment, the packaging article 100 includes a first side 122 that includes the finish film 118, and a second side 124 that includes the barrier film 120. The barrier film 124 can be added substantially simultaneously with the finish film 118 according to conventional technique.

In one embodiment, an information layer 126 is disposed above the finish film 118. By "information layer" it is understood that the packaging article 100 includes a layer that contains a printed or otherwise-applied appearance such as for a commercial application. The information layer 126 can include trademarks and/or a trade dress, among other conventional information such as product information. In one embodiment, the information layer 126 is a printed film such as an ink or other pigment that has been deposited upon the finish film 118. In another embodiment, the information layer 126 includes a plastic film with preprinted information. The plastic film can be shrink-wrapped onto the first side 122.

In an example of this embodiment, the substrate 110 is a wood-fiber material, and the sizing layer 112 is a starch sizing layer that is applied according to conventional technique. The brightener first film 114 includes a mixture of an inorganic dispersion and an organic dispersion. The inorganic dispersion includes from about 10% to about 90% calcium carbonate, with the balance kaolin clay. The brightener first film 114 has a thickness in a range from about 2 micrometers (microns) to about 20 microns. The brightener second film 116 also includes a mixture of an inorganic dispersion and an organic dispersion. The inorganic dispersion includes from about 10% to about 90% calcium carbonate, with the balance kaolin clay. The brightener second film 116 has a thickness in a range from about 2 microns to about 20 microns.

Processing

Figure 1A:
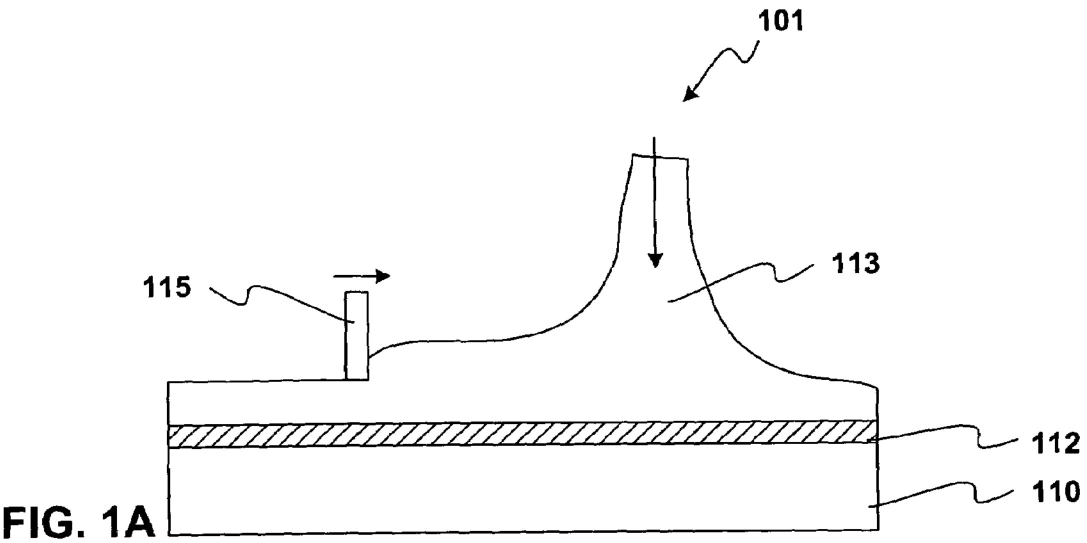
FIG. 1A is a cross-section of the packaging article depicted in FIG. 1 during its processing.

FIG. 1A is a cross-section of the packaging article 100 depicted in FIG. 1 during its processing. Processing the packaging article 101 is carried out by forming the various films over the substrate 110. After the formation of the optional sizing layer 112, a first mixture 113 is formed over the substrate 110. The first mixture 113 is depicted being poured (as motion simulated by the vertical down arrow) or otherwise formed onto the sizing layer 112, and spread (as motion simulated by the horizontal left-to-right arrow) to a selected thickness by a structure 115 such as a doctor blade, a roll, a rod, or the like. The first mixture 113 includes a first fluid content in a range from about 5% solids to about 70% solids. In one embodiment, the first mixture 113 includes a fluid content in a range from about 30% solids to about 65% solids. In one embodiment, the first mixture 113 includes a fluid content of about 60% solids.

Figure 1B:
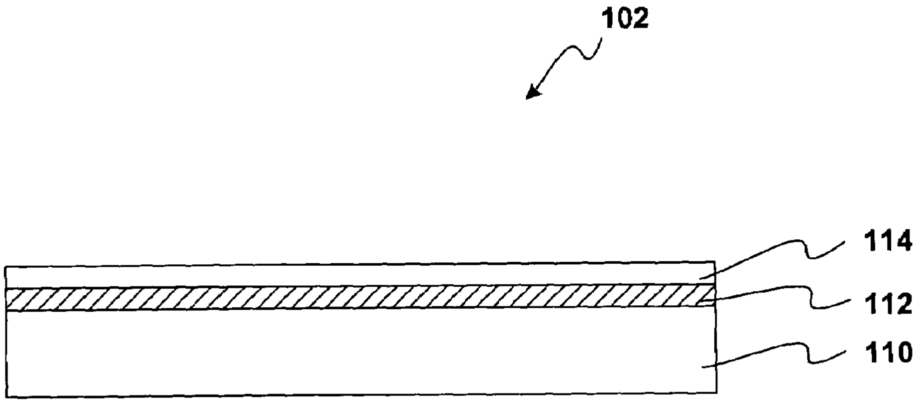
FIG. 1B is a cross-section of the packaging article depicted in FIG. 1A during its further processing.

FIG. 1B is a cross-section of the packaging article 101 depicted in FIG. 1A during its further processing. The first mixture 113 (FIG. 1A) is thereafter subjected to a process to lower the fluid content until a brightener first film 114 has solidified as part of the packaging article 102. Because one process for lowering the fluid content includes heating, FIG. 1B depicts the result of an evaporative process as the first mixture 113 (FIG. 1A) solidifies and shrinks in size to form the brightener first film 114 because a significant amount of the fluid is driven out.

Figure 1C:
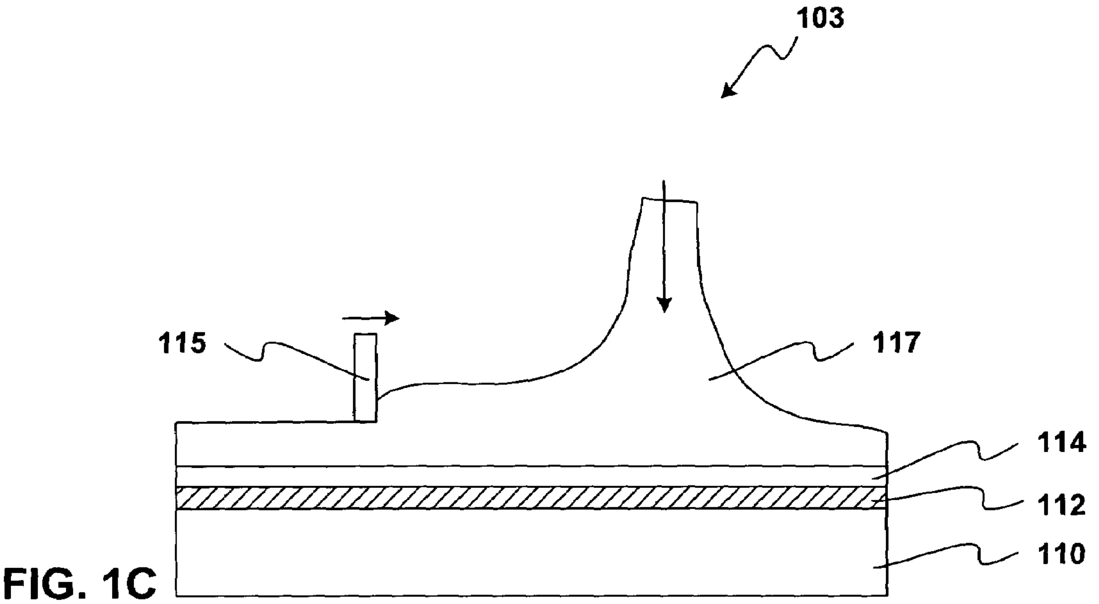
FIG. 1C is a cross-section of the packaging article depicted in FIG. 1B during its processing.

FIG. 1C is a cross-section of the packaging article 102 depicted in FIG. 1B during its processing. After the formation of the brightener first film 114, a second mixture 117 is formed over the brightener first film 114 as part of the packaging article 103. The second mixture 117 is depicted being poured (as motion simulated by the vertical down arrow) onto brightener first film 114, and spread (as motion simulated by the horizontal left-to-right arrow) to a selected thickness by a structure 115 such as a doctor blade, a roll, a rod, or the like. The second mixture 117 includes a fluid content in a range from about 5% solids to about 70% solids. In one embodiment, the second mixture 117 includes a fluid content in a range from about 30% solids to about 65% solids. In one embodiment, the second mixture 117 includes a fluid content of about 60% solids.

The brightener films 114 and 116 can be a latex-containing material or the like. In one embodiment, the brightener films 114 and 116 include polyvinyl acetate (PVAc) latex or the like. In one embodiment, the brightener films 114 and 116 include styrene butadiene (SBR) latex or the like. In one embodiment, the brightener films 114 and 116 include styrene butadiene acrylonitrile (SBA) latex or the like. In one embodiment, the brightener films 114 and 116 include ethylene vinyl acetate (EVAc) latex or the like. Other latex compositions can be used. In one embodiment, the latex includes at least one styrene copolymer. In one embodiment, the latex includes at least one styrene acrylic copolymer. In one embodiment, the latex includes at least one styrene butadiene copolymer. In one embodiment, the latex includes at least one styrene butadiene vinylidene chloride copolymer. In one embodiment, the latex includes at least one styrene isobutylene copolymer. In one embodiment, the latex includes at least one vinyl acetate copolymer. In one embodiment, the latex includes at least one acrylic copolymer. In one embodiment, the latex includes at least one acrylonitrile copolymer. In one embodiment, the latex includes at least one vinyl chloride copolymer. In one embodiment, the latex includes at least two of the polymer and/or copolymers set forth herein.

The brightener films 114 and 116 can be applied by forming a melt and applying with a doctor blade, a rod, a roll, or other conventional process.

Figure 1D:
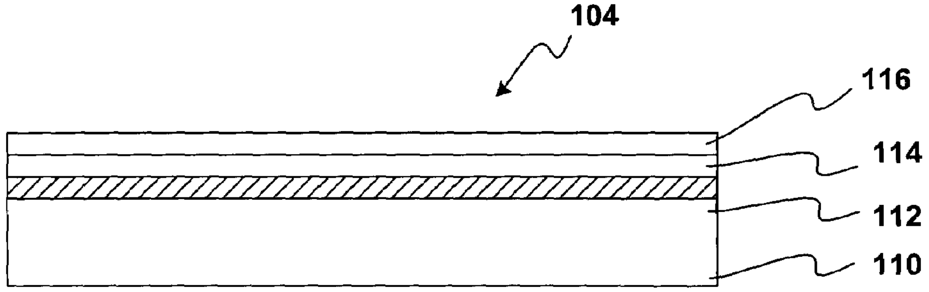
FIG. 1D is a cross-section of the packaging article depicted in FIG. 1C during its processing.

FIG. 1D is a cross-section of the packaging article 103 depicted in FIG. 1C during its processing. The second mixture 117 (FIG. 1C) is thereafter subjected to a process to reduce the fluid content until the brightener second film 116 has solidified as part of the packaging article 104. Because one process for lowering the fluid content includes heating, FIG. 1D depicts the result of an evaporative process as the second mixture 117 (FIG. 1C) solidifies and shrinks in size as a significant amount of the fluid is driven out.

FIG. 1 depicts further processing to form the finish film 118 over the brightener second layer 116. The finish film 118 can be applied by a melt of a material such as a thermoplastic, an epoxy, or other translucent materials.

In one embodiment, the finish film 118 is a high barrier ethylene vinyl alcohol (EVA) copolymer. In one embodiment, the finish film 118 is a high barrier ethylene vinyl alcohol copolymer that has from about 1% to about 90% EVA monomer by molarity. In one embodiment, the finish film 118 is a high barrier ethylene vinyl alcohol copolymer that has from about 1% to about 40% EVA monomer by molarity. In one embodiment, the finish film 118 is a high barrier ethylene vinyl alcohol copolymer that has from about 50% to about 90% EVA monomer by molarity. In one embodiment, the finish film 118 is a polyolefin polymer. In one embodiment, the finish film 118 is a low- to high-density polyethylene polymer. In one embodiment, the finish film 118 is a high barrier nylon polymer. In one embodiment, the finish film 118 is a high barrier polypropylene polymer.

The finish film 118 can be applied by forming a melt and applying through a die, and cooling the melt with a chill roll method to achieve a finish according to an application. The texture of the chill roll, the temperature differential between the chill roll and the melt, the heat transfer coefficient of the chill process, and other parameters can affect the finish imposed on the finish film 118.

In one embodiment, the finish is a flat finish. In one embodiment, the finish is a matte finish. In one embodiment, the finish is a semi-gloss finish. In one embodiment, the finish is a gloss finish. In one embodiment, the finish is a high-gloss finish. In one embodiment, the finish is a textured finish with a resiliency on substantially planar areas that is one of the flat, matte, semi-gloss, gloss, and high-gloss finishes.

Process Materials

In one embodiment, the substrate 110 is a paperboard material. In one embodiment, the substrate 110 is a starch-bound matrix of particulates and/or fiber fillers. In one embodiment, the substrate 110 is a starch-bound matrix material. In one embodiment, the substrate 110 is a thermoplastic material. In one embodiment the substrate 110 is a thermoplastic starch material. In one embodiment, a combination of at least two substrates are included.

The brightener first film 114 includes inorganic and organic compositions. Other embodiments include a major amount of calcium compound, and a minor amount of a particulate.

In one embodiment, the inorganic composition includes a major amount of calcium carbonate a minor amount of a particulate. In one embodiment, the inorganic composition includes a major amount of calcium oxide a minor amount of a particulate. For example, the calcium compound can include one of calcium citrate, calcium fluoride, calcium hydroxide, calcium magnesium carbonate, calcium oxalate, calcium phosphate (dibasic and/or tribasic), calcium silicate, calcium sulfate (anhydrite and/or gypsum), calcium sulphite, calcium tartrate, calcium tungstate, and the like. Other embodiments include a major amount of a slightly water-soluble mineral and a minor amount of a particulate.

In one embodiment, the particulate is a brightener particle including clay. In one embodiment, the particulate is a brightener particle including kaolin clay. In one embodiment, the particulate is a brightener particle including a titanium oxide.

In one embodiment, the particulate is a brightener particle including a niobium oxide. In one embodiment, the particulate is a brightener particle including an aluminum oxide. In one embodiment, the particulate is a brightener particle including a cerium oxide. In one embodiment, the particulate is a brightener particle including a thorium oxide. In one embodiment, the particulate is a brightener particle including a hafnium oxide. In one embodiment, the particulate is a brightener particle including a zirconium oxide. In one embodiment, the particulate is a brightener particle including a zinc oxide. In one embodiment, the particulate is a brightener particle including an aluminum compound such as aluminum trihydrate and the like. In one embodiment, the particulate is a brightener particle including a uranium compound such as a uranium fluoride and the like.

In one embodiment, the organic composition for the brightener first film 114 includes a binder. In one embodiment, the binder includes an acetate composition in a major amount, and a second organic composition in a minor amount. In one embodiment, the binder includes polyvinylacetate (PVAc) latex in a major amount, and styrene butadiene (SBR) in a minor amount. In one embodiment, the binder includes about 8-12 parts PVAc latex (basis 100 parts total dry pigments for the brightener first film 114), and about 4-9 parts SBR; the balance includes the calcium compound or the like, and the brightener particle.

In other embodiments, other binder compounds can be used in addition to or in place of PVAc latex. In one embodiment the major binder compound is styrene butadiene acrylonitrile (SBA). In another embodiment, the major binder compound is ethylene vinyl acetate (EVA). In another embodiment, the major binder compound is a styrene acrylic (SA). In another embodiment, the major binder compound is a combination at least two of PVAc, SBR, SBA, EVA, and SA. In another embodiment, the major binder compound is a combination at least one of PVAc, SBR, SBA, EVA, and SA, and a conventional binder.

The other binder can be compounds that are used in addition to or in place of SBR. In one embodiment the minor binder compound is at least one of PVAc, SBR, SBA, EVA, and SA.

In one embodiment, the brightener first film 114 is prepared with a first dispersion of inorganics in a ratio of 60% calcium carbonate with 40% kaolin clay. The calcium carbonate has a mesh size of about 58% passing minus-2 microns. The kaolin clay has a mesh size of about 90% passing minus-2 microns. The calcium carbonate has a brightness of about 96 on the G.E. brightness scale as known in the art (also referred to as the TAPPI scale). The organics are also provided in a second dispersion of about 10-19 parts PVAc latex or blends of various latex classes.

These first and second dispersions can be combined for a brightener first film mixture. The overall amount of organics in the brightener first film mixture is in a range from about 12% by dry weight to about 25%. The balance includes the inorganics including the major amount of a compound such as calcium carbonate or another as set forth above, and the minor amount of a particulate such as kaolin clay or another as likewise set forth above. In one embodiment the major amount is provided in a range from about 0% to about 100% of the inorganics.

In one embodiment, the brightener second film 116 is also produced under conditions that are similar to production of the brightener first film 114. In one embodiment, the brightener second film 116 is prepared with a third dispersion of inorganics, and a fourth dispersion of organics. The third dispersion includes inorganics with a minor amount of calcium carbonate and a major amount of kaolin clay. The fourth dispersion includes organics of about 10-24 parts latex blends of various latex classes.

In one embodiment, the inorganics include a minor amount of calcium compound and a major amount of a particulate. The calcium compound can be any one of a mixture of the calcium compounds set forth above. In one embodiment, the particulate is a brightener particle including such as the brightener particles set forth above.

In one embodiment, the organic composition for the brightener second film 116 includes a binder. In one embodiment, the binder includes an acetate composition and a second organic composition. In one embodiment, the binder includes PVAc latex and SBR. In one embodiment, the binder includes about 12 parts PVAc latex (basis 100 part total dry pigments), and about 12 parts SBR; the balance includes the calcium compound or the like, and the brightener particle.

In one embodiment, the brightener second film 116 is prepared with a first dispersion of inorganics in a ratio of about 40% calcium carbonate with about 60% kaolin clay. The calcium carbonate has a mesh size of about 90% or more passing minus-2 microns. The kaolin clay has a mesh size of about 90% or more passing minus-2 microns. The calcium carbonate has a brightness of about 96 on the G.E. brightness scale. The organics are also provided in a second dispersion in ratio of about 12-24 parts latex or blends of various latex classes.

These first and second dispersions can be combined for a brightener second film mixture. The overall amount of organics is in a range from about 14% by dry weight to about 30%. The balance includes the inorganics including the major amount of a compound such as kaolin clay or another as set forth above, and the minor amount of a calcium carbonate or another as likewise set forth above. In one embodiment the major amount is provided in a range from about 0% to about 100% of the inorganics.

When the first mixture and the second mixture are applied and cured, the first and second film can have certain properties. In one embodiment, the packaging article 100 includes calcium carbonate in the brightener first film 114. In this embodiment, the packaging article 100 includes the organics as a binder in the brightener first film 114 in an amount from about 12% to about 25% of PVAc latex and SBR in a total mixture including the balance, from about 75% to about 88%, of the calcium carbonate and the brightener particles mixture.

In one embodiment, the packaging article 100 includes the organics as a binder in the brightener first film 114 in an amount from about 12% to about 25% of PVAc latex and SBR. The balance of the total mixture, from about 75% to about 88%, includes the calcium carbonate and the brightener particles mixture.

In one embodiment, the packaging article 100 includes the organics as a binder in the brightener first film 114 in an amount from about 12% to about 25% of PVAc latex and SBR. The balance of the total mixture includes the calcium carbonate and the brightener particles in a ratio from about 20-80 parts calcium carbonate and about 20-80 parts brightener particles.

In one embodiment, the packaging article 100 includes the organics as a binder in the brightener second film 116 and includes from about 14% to about 30% of a mixture including PVAc latex and SBR.

In one embodiment, the brightener second film 116 includes from about 14% to about 30% of a mixture including PVAc latex and SBR. The ratio of PVAc latex to SBR is about 1:1, and the balance, from about 70% to about 86%, includes the calcium carbonate and the brightener particles in a ratio from about 20-80 parts calcium carbonate and about 20-80 parts brightener particles.

Processing Schemes

Figure 2:
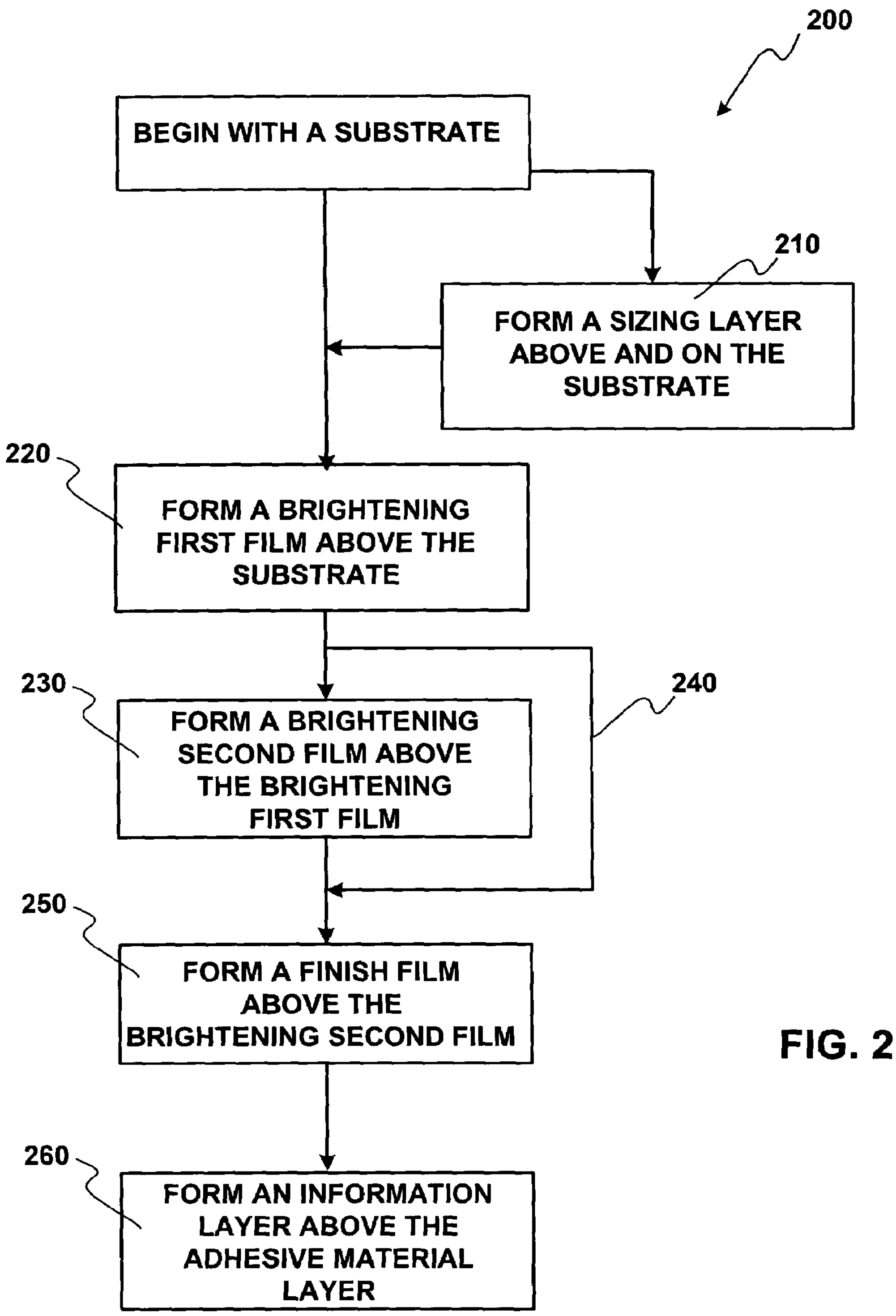
FIG. 2 is a process flow chart according to an embodiment.

FIG. 2 is a process flow chart according to an embodiment. The process 200 begins with a substrate. The substrate is often provided by a vendor, but it can be manufactured by the same manufacturing entity that achieves embodiments set forth in this disclosure. At 210, an optional starch sizing layer or the like is formed above and on the substrate according to conventional technique. This embodiment is often used where the substrate is a wood fiber material. In one embodiment, no sizing layer is formed.

At 220 a brightener first film is formed above the substrate. In one embodiment, the brightener first film is formed above and on the substrate. In another embodiment, the brightener first film is formed above and on a sizing layer. In another embodiment, the brightener first film is formed above and on a base coat that has been in turn formed above and on the substrate. In another embodiment, the brightener first film is formed above and on at least one base coat that has been in turn formed above and on the substrate.

In one embodiment, a converting process is completed at 220 on the substrate.

At 230 a brightener second film is formed above the substrate. In one embodiment, the brightener second film is formed above and on the brightener first film. In one embodiment, a converting process is completed at 230 on the substrate.

At 240, an alternative process is depicted. Instead of forming a brightener second film, the brightener first film is covered with a finish film. This embodiment can have a commercial application, for example, where the outer appearance of the packaging article is of a lesser consequence, such as for a chemical, a commodity, a feedstock, or the like.

At 250, a finish film is formed over the substrate.

At 260 further processing can be carried out by forming an information layer above and on the adhesive material layer. In one embodiment, a process embodiment ends at 260. Typically, the information layer is a printed film that communicates commercial and utilitarian messages. In one embodiment, a galley sheet is printed, die-cut, and optionally folded to meet the requirements of an application.

In one embodiment, a converting process is completed at 260 on the substrate.

By these process embodiments, it can be ascertained by one of ordinary skill in the art that mass-producible articles are achievable. It can also be ascertained that embodiments of the inventive articles and systems can be manufactured in a commercially economic manner. Such articles and systems can be rapidly produced at a rate that make their manufacture economically viable. Process embodiments are directed to the manufacture of articles and systems which solve the prior art problems of high cost and complicated processing schemes.

Packaging Embodiments

Various packaging article embodiments can be achieved by the several embodiments depicted herein and their art-recognized equivalents. One embodiment includes a gable-top packaging article configuration. The various packaging system embodiments can be achieved by combination of the various packaging article embodiments with several commercial products. Among packaging system embodiment include any of the packaging article embodiments set forth above, in combination with commercial products such as liquids, pastes, solids, powders, and other morphological forms such as composites. Among the various morphological forms include foods, cleansers, detergents, chemicals, feedstocks, and other conventional products that can be housed in folded packaging articles. By the listing of these various morphological forms and these various specific commodities, it is not insinuated that any of them are necessarily equivalent forms and/or commodities.

Due to various article embodiments, the process of skiving can be omitted, even in traditional packaging systems such as a fruit juice. However, skiving is one embodiment of the present invention, where the application is selected.

The Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description of Embodiments of the Invention, with each claim standing on its own as a separate preferred embodiment.

It will be readily understood to those skilled in the art that various other changes in the details, material, and arrangements of the parts and method stages which have been described and illustrated in order to explain the nature of this invention may be made without departing from the principles and scope of the invention as expressed in the subjoined claims.

What is claimed is:

1. A packaging article comprising:

a substrate including a first side thereof;

a brightener first film above the substrate, wherein the brightener first film includes calcium carbonate in a first amount, and brightener particles in a second amount, wherein the first amount is more than the second amount, and wherein the brightener first film includes at least one binder;

a brightener second film above the brightener first film, wherein the brightener second film includes calcium carbonate in a third amount, and brightener particles in a fourth amount, wherein the fourth amount is more than the third amount, and wherein the brightener second film includes at least one binder; and a finish third film above the brightener second film.

2. The packaging article according to claim 1, wherein the calcium carbonate in the brightener first film has a calcium carbonate/brightener particles ratio from about 50% to about 100%.

3. The packaging article according to claim 1, wherein the calcium carbonate in the brightener second film has a calcium carbonate/brightener particles ratio from about 0% to about 50%.

4. The packaging article according to claim 1, wherein the brightener particles are selected from clay, kaolin clay, titanium oxides, niobium oxides, aluminum oxides, cerium oxides, thorium oxides, hafhium oxides, zirconium oxides, zinc oxides, aluminum trihydrate, uranium fluorides, and combinations thereof.

5. The packaging article according to claim 1, wherein the brightener first film includes from about 12% to about 25% of a mixture including polyvinylacetate (PVAc) latex and styrene butadiene (SBR).

6. The packaging article according to claim 1, wherein the brightener first film includes from about 12% to about 25% of the at least one binder, and the balance the calcium carbonate and the brightener particles, and wherein the at least one binder includes a mixture including polyvinylacetate (PVAc) latex and styrene butadiene (SBR), wherein the PVAc latex and the SBR are in a ratio of about 10:9.

7. The packaging article according to claim 1, wherein the binder in the brightener first film includes about 10 parts polyvinylacetate (PVAc) latex about 9 parts styrene butadiene (SBR), and the balance includes the calcium carbonate and the brightener particles in a ratio from about 20-80 parts calcium carbonate and about 20-80 parts brightener particles.

8. The packaging article according to claim 1, wherein the binder in the brightener second film includes from about 14% to about 30% of a mixture including polyvinylacetate (PVAc) latex and styrene butadiene (SBR).

9. The packaging article according to claim 1, wherein the at least one binder in the brightener second film includes from about 14% to about 30% of a mixture including polyvinylacetate (PVAc) latex and styrene butadiene (SBR), and the balance the calcium carbonate and the brightener particles, and wherein the PVAc latex and the SBR are in a ratio of about 1:1.

10. The packaging article according to claim 1, wherein the at least one binder in the brightener second film includes about 12 parts polyvinylacetate (PVAc) latex and about 12 parts styrene butadiene (SBR), and wherein the balance includes the calcium carbonate and the brightener particles in a ratio from about 20-80 parts calcium carbonate and about 20-80 parts brightener particles.

11. The packaging article according to claim 1, wherein the finish third film is selected from ethylene vinyl alcohol copolymer, polyolefin polymer, polyethylene polymer, nylon polymer, polypropylene polymer, polyvinyl acetate latex, styrene butadiene latex, styrene butadiene aciylonitrile latex, ethylene vinyl acetate latex, and combinations thereof.

12. The packaging article according to claim 1, wherein the packaging article has a gable-top package configuration.

13. The packaging article according to claim 1, wherein the packaging article has a gable-top package configuration with an inner surface and the finish third film has an outer surface, and wherein the gable-top package is skived.

14. A packaging system comprising:

a folded and bonded substrate including first outer surface and a second inner surface, wherein the substrate includes a first side thereof;

a brightener first film above the substrate, wherein the brightener first film includes calcium carbonate in a first amount, and brightener particles in a second amount, wherein the first amount is more than the second amount, and wherein the brightener first film includes at least one binder;

a brightener second film above the brightener first film, wherein the brightener second film includes calcium carbonate in a third amount, and brightener particles in a fourth amount, wherein the fourth amount is more than the third amount, and wherein the brightener second film includes at least one binder;

a finish third film above the brightener first film; and a commercial product disposed within the folded and bonded substrate.

15. The packaging system according to claim 14, wherein the finish third film is above and on the brightener second film.

16. The packaging system according to claim 14, wherein the packaging system has a gable-top package configuration.

17. The packaging article according to claim 14, wherein the packaging system includes a skived edge.

* * * * *